United States Patent
Kim et al.

(10) Patent No.: US 11,495,783 B2
(45) Date of Patent: Nov. 8, 2022

(54) SYSTEM AND METHOD FOR REPRODUCIBLE MANUFACTURING OF ELECTRODE FOR SECONDARY BATTERY

(71) Applicant: LG Chem, Ltd., Seoul (KR)

(72) Inventors: Nam Won Kim, Daejeon (KR); Pil Kyu Park, Daejeon (KR); Han Gab Song, Daejeon (KR); Duck Joong Yun, Daejeon (KR); Dae Hyun Kim, Daejeon (KR); An Soo Jeong, Daejeon (KR)

(73) Assignee: LG Energy Solution, Ltd.

( * ) Notice: Subject to any disclaimer, the term of this patent is extended or adjusted under 35 U.S.C. 154(b) by 593 days.

(21) Appl. No.: 16/467,177

(22) PCT Filed: Jun. 27, 2018

(86) PCT No.: PCT/KR2018/007314
§ 371 (c)(1),
(2) Date: Jun. 6, 2019

(87) PCT Pub. No.: WO2019/017607
PCT Pub. Date: Jan. 24, 2019

(65) Prior Publication Data
US 2019/0319256 A1    Oct. 17, 2019

(30) Foreign Application Priority Data

Jul. 20, 2017  (KR) .......................... 10-2017-0092289

(51) Int. Cl.
*H01M 4/04* (2006.01)
*B21B 37/16* (2006.01)
(Continued)

(52) U.S. Cl.
CPC ............. *H01M 4/0435* (2013.01); *B21B 1/24* (2013.01); *B21B 37/16* (2013.01); *B21B 38/08* (2013.01); *H01M 4/04* (2013.01)

(58) Field of Classification Search
CPC .... H01M 4/0435; H01M 4/04; H01M 4/0404; B21B 1/24; B21B 37/16; B21B 38/08; B21B 1/30; Y02E 60/10; G01J 1/02
See application file for complete search history.

(56) References Cited

U.S. PATENT DOCUMENTS

| | | | |
|---|---|---|---|
| 5,048,326 A * | 9/1991 | Toida ................... | G01B 5/0002 73/105 |
| 2011/0052954 A1* | 3/2011 | Fujiwara ............... | H01M 4/131 429/94 |

(Continued)

FOREIGN PATENT DOCUMENTS

| CN | 102125907 A | 7/2011 |
|---|---|---|
| CN | 103947027 A | 7/2014 |

(Continued)

OTHER PUBLICATIONS

Machine translation of KR20150141412A, Song et al., 2015 (Year: 2015).*

(Continued)

*Primary Examiner* — Kwang Han
(74) *Attorney, Agent, or Firm* — Lerner, David, Littenberg, Krumholz & Mentlik, LLP (57) ABSTRACT

A system for manufacturing an electrode for a secondary battery is disclosed herein. In an embodiment, the system for manufacturing the electrode for the secondary battery comprises a supply roller for supplying a collector having a long sheet shape; an electrode active material coating device for applying an electrode active material to a surface of the collector supplied by the supply roller to manufacture an unfinished electrode; a rolling roller for rolling a surface of (Continued)

the unfinished electrode and adjusting a thickness of the electrode active material to manufacture a finished electrode; and an electrode quality inspection device for inspecting quality of the electrode through a surface roughness value of the rolling roller, a surface roughness value of the surface of the electrode, and a rolling load value of the rolling roller.

14 Claims, 7 Drawing Sheets

(51) Int. Cl.
  *B21B 38/08* (2006.01)
  *B21B 1/24* (2006.01)

(56) References Cited

U.S. PATENT DOCUMENTS

| | | | |
|---|---|---|---|
| 2012/0231353 A1 | 9/2012 | Bulan et al. | |
| 2013/0095380 A1 | 4/2013 | Affinito et al. | |
| 2014/0342225 A1 | 11/2014 | Isshiki et al. | |
| 2015/0017510 A1 | 1/2015 | Terado | |
| 2015/0318539 A1 | 11/2015 | Kelley et al. | |
| 2017/0092987 A1* | 3/2017 | Haga | H01M 10/0585 |

FOREIGN PATENT DOCUMENTS

| | | | | |
|---|---|---|---|---|
| CN | 104916814 A | * | 9/2015 | H01M 10/0525 |
| CN | 104916814 A | | 9/2015 | |
| CN | 105355840 A | | 2/2016 | |
| EP | 3021396 A1 | | 5/2016 | |
| JP | 2003323886 A | | 11/2003 | |
| JP | 2008164377 A | | 7/2008 | |
| JP | 2015041515 A | | 3/2015 | |
| JP | 6071219 B2 | | 2/2017 | |
| JP | 2017515277 A | | 6/2017 | |
| JP | 2018063776 A | | 4/2018 | |
| KR | 20020055725 A | | 7/2002 | |
| KR | 100958649 B1 | | 5/2010 | |
| KR | 20140009015 A | | 1/2014 | |
| KR | 20140121457 A | | 10/2014 | |
| KR | 20150141412 A | | 12/2015 | |
| KR | 20150141412 A | * | 12/2015 | B05C 11/025 |
| KR | 20170030174 A | | 3/2017 | |
| KR | 20170046910 A | | 5/2017 | |
| WO | 2013039131 A1 | | 3/2013 | |

OTHER PUBLICATIONS

Machine translation of CN 104916814, Wu et al., 2015 (Year: 2015).*
Extended European Search Report with Written Opinion for Application No. 18835182.9 dated Apr. 24, 2020, 9 pages.
Liangliang Zhu et al., "Mechanical Manufacturing Technology", Xidian University Press, (Jan. 31, 2017), 4 pgs.
Yi-jun Zhang et al., "Graphene oxide modified metallic lithium electrode and its electrochemical performances in lithium-sulfur full batteries and symmetric lithium-metal coin cells", RSC Advances, vol. 6, No. 70, (Jul. 6, 2016), pp. 66161-66168.
Search Report for Chinese Application No. 201880004628.5 dated Jun. 18, 2021, 3 pages.
International Search Report for PCT/KR2018/007314 dated Feb. 19, 2019.

* cited by examiner

| SURFACE ROUGHNESS OF ELECTRODE(um) | | |
|---|---|---|
| ELECTRODE | ROLL ROUGHNESS 1.0um | ROLL ROUGHNESS 0.4um |
| 1 | 0.77 | 0.44 |
| 2 | 0.65 | 0.46 |
| 3 | 0.69 | 0.43 |
| 4 | 0.57 | 0.47 |
| 5 | 0.62 | 0.43 |
| MEAN VALUE | 0.66 | 0.45 |

SYSTEM AND METHOD FOR REPRODUCIBLE MANUFACTURING OF ELECTRODE FOR SECONDARY BATTERY

CROSS-REFERENCE TO RELATED APPLICATION

The present application is a national phase entry under 35 U.S.C. § 371 of International Application No. PCT/KR2018/007314, filed on Jun. 27, 2018, which claims priority from Korean Patent Application No. 10-2017-0092289, filed on Jul. 20, 2017, the disclosures of which are hereby incorporated by reference.

TECHNICAL FIELD

The present invention relates to a system and method for manufacturing an electrode for a secondary battery, and more particularly, to a system and method manufacturing an electrode for a secondary battery, which inspect quality of the electrode through a surface roughness and a linear pressure (rolling load) of a rolling roller and a surface roughness of the electrode.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly has a structure in which a plurality of electrodes and a plurality of separators are alternately stacked.

The electrode comprises a collector and an electrode active material applied to a surface of the collector. A method for manufacturing the electrode comprises a step of supplying a collector, a step of applying an electrode active material to a surface of the collector to manufacture an unfinished electrode, and a step of rolling the unfinished electrode by using a rolling roller to manufacture a finished electrode.

However, in the method for manufacturing the electrode, as the rolling process of the electrode is repeated, a surface roughness of the rolling roller gradually increases. When the electrode is rolled by using the rolling roller of which the surface roughness increases, a surface roughness of the electrode may be deteriorated to continuously produce abnormal electrodes.

DISCLOSURE OF THE INVENTION

Technical Problem

The present invention has been made to solve the above-described problems, and an object of the present invention is to provide a system and method for manufacturing an electrode for a secondary battery, in which quality of the electrode is inspected through a surface roughness and a linear pressure (rolling load) of a rolling roller for rolling the electrode and a surface roughness of the rolled electrode to prevent abnormal electrodes from being produced, and in particular to accurately confirm replacement of the rolling roller.

Technical Solution

To achieve the above-described object, a system for manufacturing an electrode for a secondary battery according to an embodiment of the present invention comprises: a supply roller supplying a collector having a long sheet shape; an electrode active material coating device applying an electrode active material to a surface of the collector supplied by the supply roller to manufacture an unfinished electrode; a rolling roller rolling a surface of the unfinished electrode and adjusting a thickness of the electrode active material to manufacture a finished electrode; and an electrode quality inspection device comprising a rolling roller measuring unit measuring surface roughness of the rolling roller, an electrode measuring unit measuring a surface roughness of the electrode active material applied to the finished electrode, a pressure measuring unit measuring a rolling load applied from the rolling roller to the unfinished electrode, and an inspection unit performing a first inspection for determining whether the surface roughness value of the rolling roller, which is measured by the rolling roller measuring unit, is within a range of an inputted surface roughness value of the rolling roller, performing a second inspection for determining whether a surface roughness value of the finished electrode, which is measured by the electrode measuring unit, is within a range of an inputted surface roughness of the electrode, and performing a third inspection for determining whether a pressure load value of the rolling roller, which is measured by the pressure measuring unit, is within a range of an inputted rolling load value.

The electrode quality inspection device may determine the finished electrode as a normal product when all of the results are determined as being normal through the first to third inspections, determine the finished electrode as a product to be re-inspected when one or two results are determined as being normal, and the rest result is determined as being abnormal through the first to third inspections, and determine the finished electrode as an abnormal product when all of the results are determined as being abnormal through the first to third inspections.

The electrode quality inspection device may have an inspection period in which the first, second, and third inspections are performed at intervals of 2 weeks to 4 weeks.

The electrode quality inspection device may re-inspect the surface roughness of the rolling roller or the electrode and the rolling load of the rolling roller, which are determined as being abnormal, when one or two results are determined as being normal, and the rest result is determined as being abnormal through the first to third inspections.

The electrode quality inspection device may stop an operation of the rolling roller when the surface roughness of the rolling roller or the electrode and the rolling load of the rolling roller, which are determined as being abnormal, are determined as being abnormal even after the re-inspection.

The electrode quality inspection device may change the inspection period of 2 weeks to 4 weeks, at which the first to third inspections are performed, into an inspection period of 2 days to 7 days when the surface roughness of the rolling roller or the electrode and the rolling load of the rolling roller, which are determined as being abnormal, are determined as being normal through the re-inspection.

The electrode quality inspection device may stop an operation of the rolling roller when all of the results are determined as being abnormal through the first to third inspections.

The rolling roller measuring unit may comprise a roughness tester measuring the surface roughness while contacting the surface of the rolling roller, and in the roughness tester, a tip having a needle shape, which is attached to one surface, may measure roughness while moving from a surface of one end to a surface of the other end of the rolling roller and calculate a mean value of a maximum mountain height and a minimum mountain height within a moving distance to calculate the surface roughness value of the rolling roller.

The roughness tester may measure the surface roughness at at least four spots in a circumferential direction of the rolling roller.

The inputted surface roughness value of the rolling roller may range of 0.5 µm or less.

The electrode measuring unit may comprise an optical measuring part measuring surface roughness while enlarging and photographing the surface of the finished electrode, and the optical measuring part may enlarge and photograph the surface of the finished electrode while moving from one end to the other end in a width direction of the finished electrode and calculates a maximum mountain height and a minimum mountain height within the moving distance to calculate the surface roughness value of the finished electrode.

The inputted surface roughness value of the rolling roller may be 3 µm or less.

The pressure measuring unit may comprise a pressure sensor, and the pressure sensor may measure the rolling load applied to the unfinished electrode through the rolling roller to calculate the rolling load value.

The inputted rolling load value of the rolling roller may be 1.5 kg/m$^2$ to 2.0 kg/m$^2$.

A method for manufacturing an electrode for a secondary battery according to an embodiment of the present invention comprises: a supply step (S10) of supplying a collector having a long sheet shape; an electrode active material coating step (S20) of applying an electrode active material to a surface of the collector to manufacture an unfinished electrode; an electrode manufacturing step (S30) of rolling a surface of the unfinished electrode by using a rolling roller and adjusting a thickness of the electrode active material to manufacture a finished electrode; and an electrode quality inspection step (S40) comprising a first process (S41) of measuring a surface roughness value of the rolling roller, a second process (S42) of measuring a surface roughness value of the electrode active material applied to the finished electrode, a third process (S43) of measuring a rolling load applied from the rolling roller to the electrode, a fourth process (S44) of performing a first inspection to determine whether the measured surface roughness value of the rolling roller is within a range of the inputted surface roughness value of the rolling roller, a fifth process (S45) of performing a second inspection to determine whether the measured surface roughness value of the finished electrode is within a range of the inputted surface roughness value of the electrode, and a sixth process (S46) of performing a third inspection to determine whether the rolling load value of the rolling roller is within a range of the inputted rolling load value of the rolling roller.

In the electrode quality inspection step (40), the finished electrode may be determined as a normal product when all of the results are determined as being normal through the first to third inspections, determined as a product to be re-inspected when one or two results are determined as being normal, and the rest result is determined as being abnormal through the first to third inspections, and determined as an abnormal product when all of the results are determined as being abnormal through the first to third inspections.

Advantageous Effects

The present invention has effects as follows.

First: The system for manufacturing the electrode for the secondary battery may comprise the electrode quality inspection device comprising the rolling roller measuring part, the pressure measuring part, the electrode measuring part, and the inspection part. Due to the above-described structural features, the abnormal electrodes may be prevented from being produced, and in particular, the replacement time of the rolling roller may be accurately confirmed.

Second: In the system for manufacturing the electrode for the secondary battery, if all of the surface roughness of the rolling roller, the surface roughness of the electrode active material, and the rolling load value of the rolling roller are normal, it may be determined as the normal product. If any one or two are abnormal, it may be determined as a re-inspection product, and if all of them are abnormal, it may be determined as the abnormal product. Due to the above-described features, the electrode may be more finely divided according to the quality thereof, and in particular, the quality inspection of the electrode may be improved in accuracy.

Third: The system for manufacturing the electrode for the secondary battery may have the inspection period to inspect the surface roughness and the rolling load of the rolling roller and the surface roughness of the electrode at intervals of 2 weeks to 4 weeks. Due to the above-described features, the quality inspection of the electrode may be stably performed within the range that does not significantly deteriorate the productivity of the electrode.

Fourth: In the system for manufacturing the electrode for the secondary battery, if the electrode is determined as the product to be re-inspected, the surface roughness of the rolling roller, the surface roughness of the electrode, and the rolling load of the rolling roller, which are inspected as abnormal, may be re-inspected. Due to the above-described features, the abnormal inspection due to the measurement error may be prevented, and thus, the quality inspection of the electrode may be significantly improved in accuracy.

Fifth: In the system for manufacturing the electrode for the secondary battery, if the surface roughness of the rolling roller, the surface roughness of the electrode, and the rolling load of the rolling roller are re-inspected and then determined as being normal, the inspection period may be shortened to 2 day to 7 day at intervals of 2 weeks to 4 weeks. Thus, the timing of occurrence of the abnormal electrode may be more precisely and quickly confirmed.

Sixth: in the system for manufacturing the electrode for the secondary battery, if all of the surface roughness of the rolling roller, the surface roughness of the electrode, and the rolling load of the rolling roller are determined as being abnormal, the operation of the rolling roller may be stopped. Due to the above-described features, the abnormal electrodes may be prevented from being produced. Particularly, the replacement time of the rolling roller may be precisely predicted through the quality inspection for the electrode, and thus, the rolling roller that is determined as being abnormal may be replaced and mounted to perform the process of manufacturing the electrode again.

Seventh: The system for manufacturing the electrode for the secondary battery according to the present invention may inspect the surface roughness of the rolling roller through the roughness tester. Due to the above-described features, the surface roughness value of the rolling roller may be more precisely inspected.

Eighth: The system for manufacturing the electrode for the secondary battery according to the present invention may inspect the surface roughness value of the electrode active material unit applied to the electrode through the optical measuring part. Due to the above-described features, the surface roughness value of the electrode active material unit may be more precisely inspected.

Ninth: The system for manufacturing the electrode for the secondary battery according to the present invention may measure the rolling load applied from the rolling roller to the electrode through the pressure sensor. Due to the above-described features, the rolling load value of the rolling roller may be more precisely inspected.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[System for Manufacturing Electrode for Secondary Battery According to Embodiment]

Figure 1:
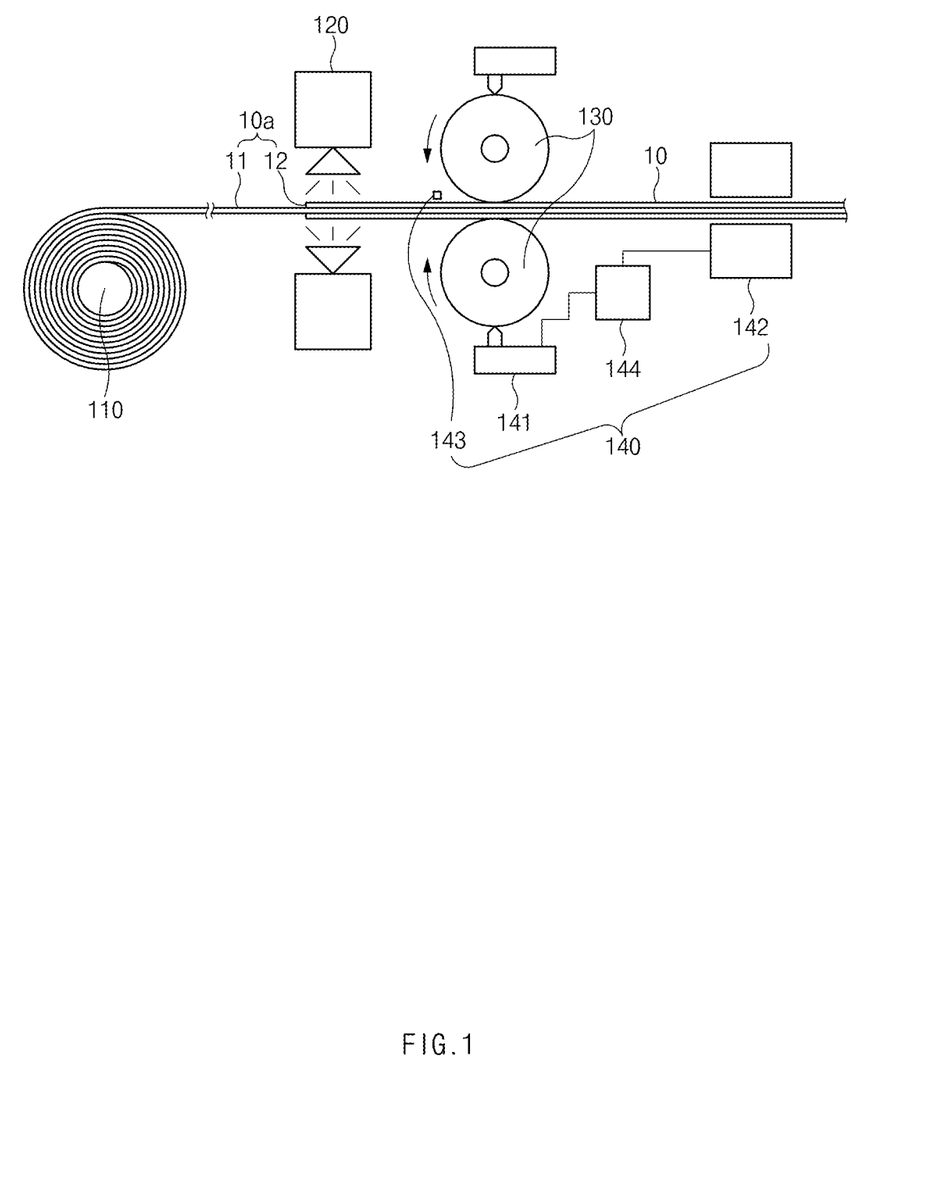
FIG. 1 is a view of a system for manufacturing an electrode for a secondary battery according to an embodiment of the present invention.

As illustrated in FIG. 1, a system for manufacturing an electrode for a secondary battery according to an embodiment of the present invention comprises a supply roller 110 supplying a collector 11 having a long sheet shape, an electrode active material coating device 120 applying an electrode active material 12 to a surface of the collector 11 supplied by the supply roller 110 to manufacture an unfinished electrode 10a, a rolling roller 130 rolling a surface of the unfinished electrode 10a and adjusting a thickness of the electrode active material 12 to manufacture a finished electrode 10, and an electrode quality inspection device 140 inspecting quality of the finished electrode 10 through a surface roughness of the rolling roller 130, a rolling load of the rolling roller 130, and a surface roughness of the finished electrode 10 passing through the rolling roller 130.

The collector 11 having the long sheet shape is wound around the supply roller 110. When the supply roller 110 rotates, the wound collector 11 having the long sheet shape is supplied to the electrode active material coating device 120.

The electrode active material coating device 120 comprises a storage unit in which the electrode active material 12 is stored and an injection nozzle injecting the electrode active material 12 stored in the storage unit into a surface of the collector 11. That is, the electrode active material coating device 120 may apply the electrode active material 12 onto the surface of the collector 11 to manufacture the unfinished electrode 10a.

The rolling roller 130 may be provided in a pair to roll top and bottom surfaces of the unfinished electrode 10a at the same time and adjust a thickness of the electrode active material 12 of the unfinished electrode 10a, thereby manufacturing the finished electrode 10.

The surface roughness on the surface of the rolling roller 130 may be significantly deteriorated by stretches occurring while rolling the unfinished electrode 10a. When the unfinished electrode 10a is rolled by using the rolling roller 130 of which the surface roughness is deteriorated, the surface roughness of the unfinished electrode 10a may be significantly deteriorated to deteriorate battery performance and thereby to produce an abnormal electrode.

Also, the surface roughness of the unfinished electrode 10a may be deteriorated due to a difference in rolling load applied from the rolling roller 130 to the unfinished electrode 10a.

To solve above problems, the present invention comprises an electrode quality inspection device 140 for performing a quality inspection of the electrode through the surface roughness and the rolling load of the rolling roller 130 and the surface roughness of the finished electrode 10. Particularly, the electrode quality inspection device 140 may inspect the quality of the finished electrode 10 and also more precisely confirm a replacement time of the rolling roller 130 of which the surface roughness is deteriorated.

That is, the electrode quality inspection device 140 comprises a rolling roller measuring unit 141 measuring the surface roughness of the rolling roller 130, an electrode measuring unit 142 measuring the surface roughness of the electrode active material 12 applied to the finished electrode 10, a pressure measuring unit 143 measuring the rolling load applied from the rolling roller 130 to the unfinished electrode 10a, and an inspection unit 144 inspecting quality of the finished electrode 10 on the basis of a surface roughness value Rz of the rolling roller 130, which is measured by the rolling roller measuring unit 141, a surface roughness value Rz of the finished electrode 10, which is measured by the electrode measuring unit 142, and a rolling load value of the rolling roller 130, which is measured by the pressure measuring unit 143.

Figure 2:
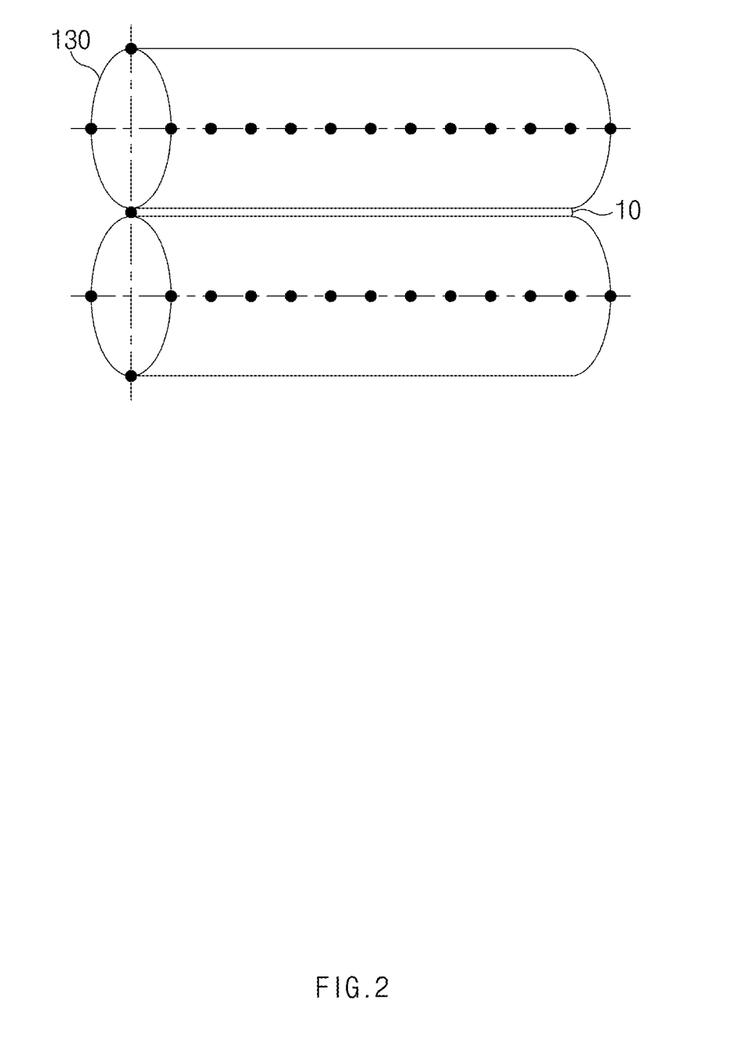
FIG. 2 is a perspective view illustrating a rolling roller measuring portion of a device for inspecting quality of the electrode according to an embodiment of the present invention.

Referring to FIGS. 1 and 2, the rolling roller measuring unit 141 comprises a roughness tester measuring the surface roughness while contacting the surface of the rolling roller 130. In the roughness tester, a tip having a needle shape, which is attached to one surface, measures roughness while moving from a surface of one end to a surface of the other end of the rolling roller 130 and then calculates a mean value of a maximum mountain height and a minimum mountain height within the moving distance and thereby to calculate the surface roughness value Rz of the rolling roller 130.

For example, as illustrated in FIG. 2, the roughness tester measures roughness while moving along points indicated in a longitudinal direction of the rolling roller 130 and calculates a mean value of the measured roughness values, thereby calculating the surface roughness value Rz of the rolling roller 130.

Particularly, the roughness tester may measure surface roughness at at least four spots in a circumferential direction of the rolling roller 130 and calculate a mean value of the surface roughness, which are measured at the at least four spots, to calculate a surface roughness value Rz of the rolling roller 130, thereby more precisely calculating the surface roughness value Rz of the rolling roller 130.

The electrode measuring unit 142 comprises an optical measuring part measuring surface roughness while enlarging and photographing a surface of the finished electrode 10. The optical measuring part may enlarge and photograph the surface of the finished electrode 10 while moving from one end to the other end in a width direction of the finished electrode 10 and then calculate a maximum mountain height and a minimum mountain height within the moving distance to calculate the surface roughness value Rz of the finished electrode 10. Particularly, the optical measuring part may measure surface roughness at at least four spots in the width direction of the finished electrode 10 and calculate a mean value of the surface roughness, which are measured at the at least four spots, to calculate a surface roughness value Rz of the finished electrode 10, thereby more precisely calculating the surface roughness value Rz of the rolling roller 10.

Figure 4A:
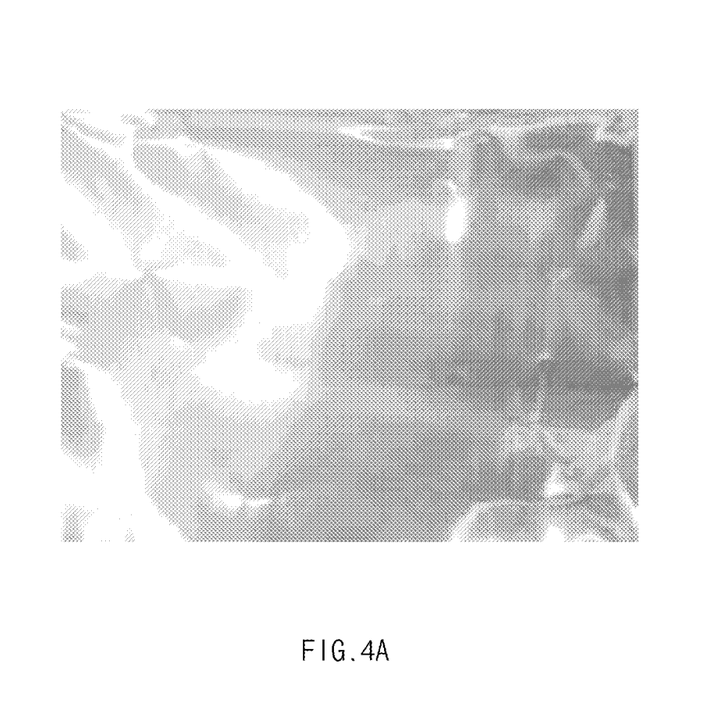
FIG. 4A is a photograph of the surface roughness of an electrode from a first experimental example showing a measurement state of a surface roughness of the electrode according to an embodiment of the present invention
Figure 5A:
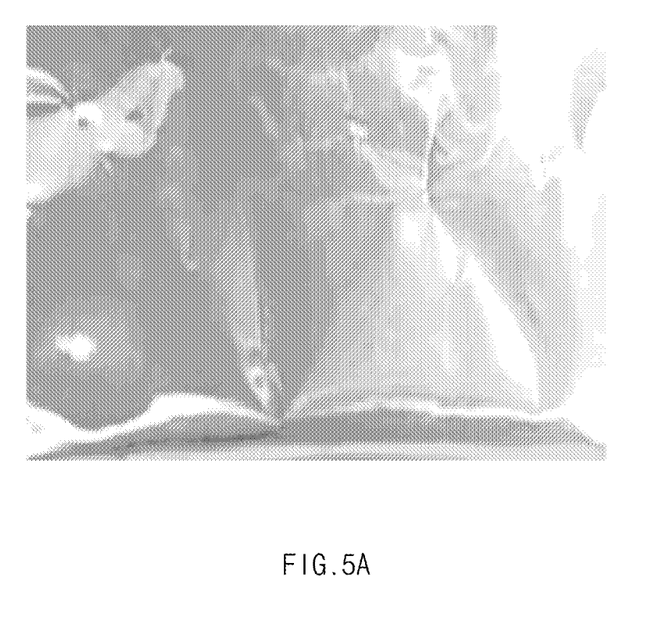
FIG. 5A is a photograph of the surface roughness of an electrode from a second experimental example showing a measurement state of a surface roughness of the electrode according to an embodiment of the present invention

For example, as illustrated in FIGS. 4A and 5A, the optical measuring part enlarges and photographs the surface of the finished electrode 10. Also, the optical measuring part moves from one side to the other side of the enlarged and photographed picture. Here, the heights of the mountains within the moving distance are displayed in a waveform on a monitor. Here, the surface roughness value Rz of the rolling roller, which is measured by the rolling roller measuring unit 141 may be displayed on the monitor, and the surface roughness value Rz of the finished electrode 10, which is measured by the optical measuring part, which is disposed below the rolling roller measuring unit 141. Thus, the surface roughness of the rolling roller 130 and the finished electrode 10 may be confirmed at once.

FIRST EXPERIMENTAL EXAMPLE

Figure 4B:
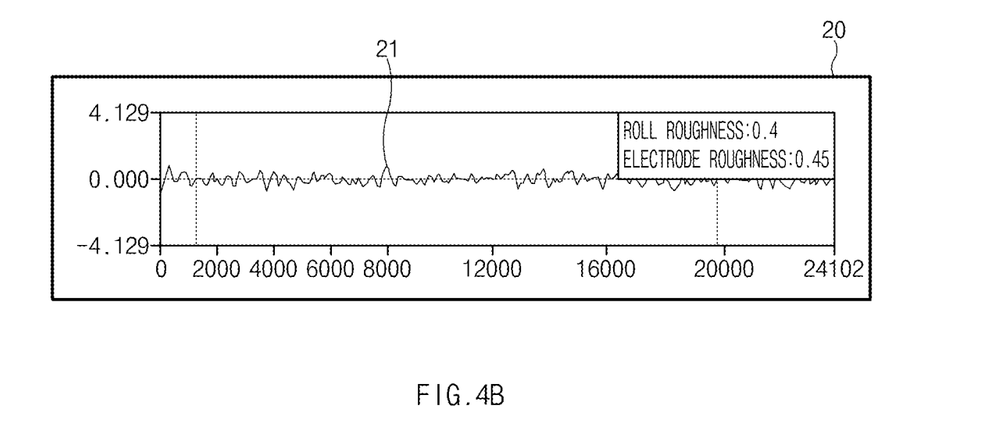
FIG. 4B is a graph of a surface roughness value of the electrode from the first experimental example.

As a first experimental example, referring to FIGS. 4A and 4B, the electrode measuring unit 142 displays 0.4 μm that is a surface roughness value Rz of the rolling roller, which is measured by the rolling roller measuring unit 141, on a monitor 20 (see FIG. 4B). Next, the electrode measuring unit 142 enlarges and photographs a surface of the finished electrode 10 (see FIG. 4A). Next, the electrode measuring unit 142 displays a mountain height (or roughness) on the monitor 20 in a waveform 21 while moving from one side to the other side of the enlarged and photographed picture, and a mean value of a maximum height and a minimum height of the displayed waveform is calculated to calculate the surface roughness value Rz of the finished electrode 10. Here, referring to the waveform of FIG. 4B, the surface roughness value Rz of the finished electrode 10 is calculated to 0.45 μm, and 0.45 μm that is the calculated surface roughness value Rz of the finished electrode 10 is displayed on the monitor 20.

Thus, when the unfinished electrode 10a is rolled by using the rolling roller 130 having a surface roughness value Rz of 0.4 μm, the finished electrode having 0.45 μm of the surface roughness value Rz may be manufactured.

SECOND EXPERIMENTAL EXAMPLE

Figure 5B:
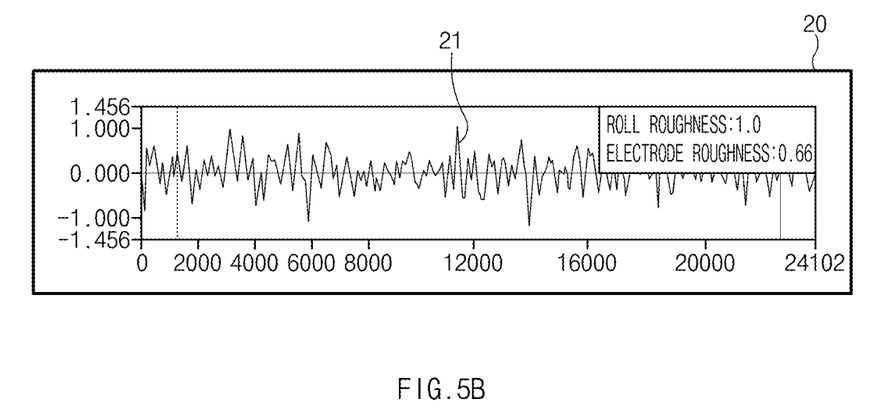
FIG. 5B is a graph of a surface roughness value of the electrode from the second experimental example.

As a second experimental example, referring to FIGS. 5A and 5B, the electrode measuring unit 142 displays 1.0 μm that is a surface roughness value Rz of the rolling roller, which is measured by the rolling roller measuring unit 141, on a monitor 20 (see FIG. 5B). Next, the electrode measuring unit 142 enlarges and photographs a surface of the finished electrode 10 (see FIG. 5A). Next, the electrode measuring unit 142 displays a mountain height (or roughness) on the monitor 20 in a waveform 21 while moving from one side to the other side of the enlarged and photographed picture, and a mean value of a maximum height and a minimum height of the displayed waveform is calculated to calculate 0.66 μm that is a surface roughness value Rz of the finished electrode 10. Then, 0.66 μm that is the calculated surface roughness value Rz of the finished electrode 10 is displayed on the monitor 20.

Thus, when the unfinished electrode 10a is rolled by using the rolling roller 130 having a surface roughness value Rz of 1.0 μm, the finished electrode having 0.66 μm of the surface roughness value Rz may be manufactured.

THIRD EXPERIMENTAL EXAMPLE

Figure 3:
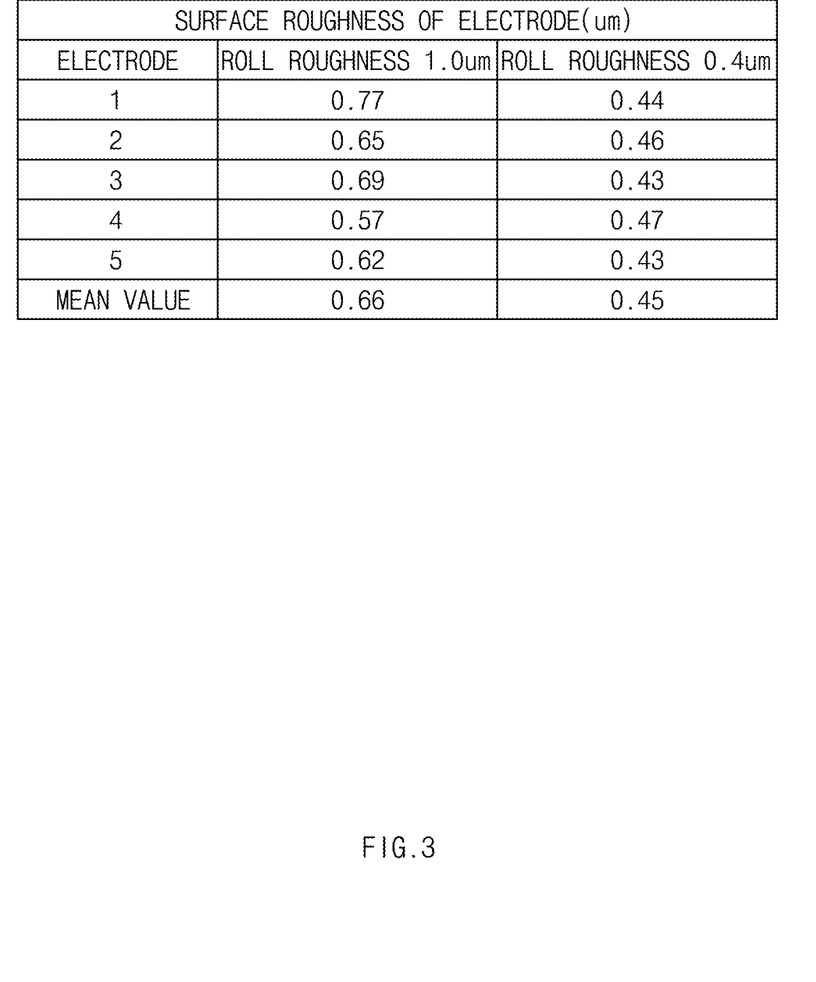
FIG. 3 is an inspection chart illustrating results obtained through the system for manufacturing the electrode for the secondary battery according to an embodiment of the present invention.

As a third experimental example, the first experimental example and the second experimental example are performed on five unfinished electrodes 10a, and the results may be summarized as shown in the table of FIG. 3. That is, a mean surface roughness value of the rolling roller 130 and a mean surface roughness value Rz of the finished electrode may be calculated, and a quality inspection of the finished electrode 10 and whether or not the rolling roller is replaced may be inspected through the mean surface roughness value of the rolling roller 130 and the mean surface roughness value Rz of the finished electrode 10.

The pressure measuring unit 143 may comprise a pressure sensor measuring a rolling load applied from the rolling roller 130 to the unfinished electrode 10a. The pressure sensor measures a rolling load applied to the unfinished electrode 10a through the rolling roller 130 to calculate a rolling load value. For example, the pressure sensor is installed between the rolling roller 130 and the unfinished electrode 10a to detect a variation in load applied while the unfinished electrode 10a is rolled by the rolling roller 130, thereby calculating a rolling load value of the rolling roller 130.

The inspection unit 144 performs a first inspection on the basis of the surface roughness value Rz of the rolling roller 130, which is calculated by the rolling roller measuring unit 141, performs a second inspection on the basis of the surface roughness value Rz of the finished electrode 10, which is calculated by the electrode measuring unit 142, and performs a third inspection to determine whether the rolling load value of the rolling roller, which is measured by the pressure measuring unit 143, is within a range of the inputted rolling load value of the rolling roller, thereby precisely inspecting the quality of the finished electrode 10.

For example, the inspection unit 144 performs a first inspection for determining whether the surface roughness value Rz of the rolling roller 130, which is measured by the rolling roller measuring unit 141, is within a range of the inputted surface roughness value Rz of the rolling roller, performs a second inspection for determining whether the surface roughness value Rz of the finished electrode 10, which is measured by the electrode measuring unit 142, is within a range of the inputted surface roughness of the electrode, and performs a third inspection for determining whether the pressure load value of the rolling roller, which is measured by the pressure measuring unit 143, is within a range of the inputted rolling load value.

Also, the inspection unit 144 may determine the finished electrode 10 as a normal product when all of the results are determined as being normal through the first, second, and third inspections. Also, when one or two results are determined as being normal, and the rest result is determined as being abnormal through the first, second, and third inspections, the finished electrode 10 is determined as a product to be re-inspected. Also, the inspection unit 144 may determine the finished electrode 10 as an abnormal product when all of the results are determined as being abnormal through the first, second and third inspections.

Here, the inspection unit 144 recognizes that there is no problem in the surface roughness of the rolling roller 130 and the surface roughness of the finished electrode 10 when the finished electrode 10 is determined as the normal product. Thus, the inspection period of the surface roughness of the rolling roller 130 and the surface roughness of the finished electrode 10 may be set long to improve efficiency of the work. For example, the inspection unit 144 has an inspection period for inspecting the surface roughness of the rolling roller 130 and the electrode 10 at intervals of 2 weeks to 4 weeks.

The inspection unit 144 re-inspects the surface roughness of the rolling roller 130 or the surface roughness of the finished electrode 10 when one or two results are determined as being normal, and the rest result is determined as being abnormal through the first, second, and third inspections. For example, the inspection unit 144 may determine that a measurement error occurs when the result is determined as being abnormal through the first inspection, and the results are determined as being normal through the second and third inspections, or when the results are determined as being normal through the first and second inspections, and the result is determined as being abnormal through the third inspection. Thus, the surface roughness and the rolling load of the rolling roller 130 and the surface roughness of the finished electrode 10, which are determined as being abnormal, may be re-inspected to prevent abnormal inspection due to the measurement error from occurring, thereby improving accuracy of the inspection.

Here, the inspection unit stops the operation of the rolling roller 130 so that the abnormal electrode is continuously manufactured when the surface roughness and the rolling load of the rolling roller 130 and the surface roughness of the finished electrode 10, which are determined as being abnormal, are determined as being abnormal even after the re-inspection. Also, the abnormal rolling roller may be replaced with a new rolling roller to perform the electrode manufacturing process again. Thus, the replacement period of the rolling roller 130 may be accurately confirmed.

When the surface roughness and the rolling load of the rolling roller and the surface roughness of the electrode, which are determined as being abnormal, are determined as normal after the re-inspection, the finished electrode 10 that is the re-inspected product may be determined as the normal product. Also, the inspection unit 144 may change the inspection period to a shorter period because the occurrence of the abnormal rolling roller 130 is likely to occur again. For example, the inspection period of the inspection unit 144 is changed from a period of 2 weeks to 4 weeks to a period of 2 days to 7 days. Thus, the occurrence time of the abnormal rolling roller 130 or finished electrode 10 may be more accurately and quickly confirmed.

The range of the inputted surface roughness value Rz of the rolling roller 130 may be 0.5 μm or less, preferably, 0.4 μm or less. That is, when the range of the inputted surface roughness value Rz of the rolling roller 130 is 0.5 μm or more, the surface roughness of the finished electrode may be significantly deteriorated to deteriorate performance. Thus, the range of the inputted surface roughness value Rz of the rolling roller 130 may be 0.5 μm or less, preferably, 0.4 μm or less to prevent the quality of the electrode from being deteriorated.

The inputted surface roughness value Rz of the electrode may be 3 μm or less, preferably, 2 μm or less. That is, when the inputted surface roughness value Rz of the electrode is 3 μm or more, there is a problem that the performance of the finished electrode is significantly deteriorated. Thus, the inputted surface roughness value Rz of the electrode may be 3 μm or less, preferably, 2 μm or less to prevent the quality of the electrode from being deteriorated.

The range of the inputted rolling load value of the rolling roller 130 may be 1.5 kg/m² to 2.0 kg/m². That is, when the range of the inputted rolling load value of the rolling roller 130 is 1.5 kg/m² or less, there is a problem that the finished electrode 10a is not effectively rolled. When the range of the inputted rolling load value of the rolling roller 130 is 2.0 kg/m² or more, the unfinished electrode 10a may be strongly rolled, and thus, it may be difficult to accurately adjust a thickness. Particularly, frictional force between the rolling roller 130 and the unfinished electrode 10a may significantly increase to greatly cause the surface roughness.

FOURTH EXPERIMENTAL EXAMPLE

Figure 6:
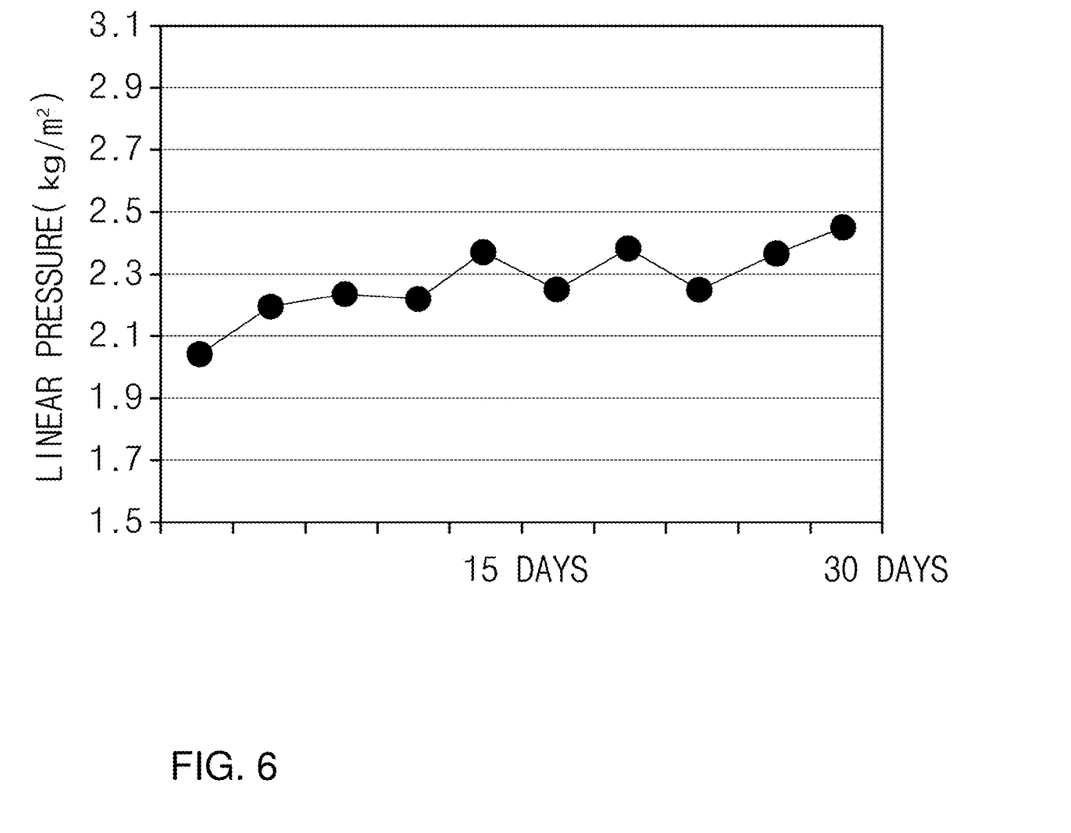
FIG. 6 is a graph illustrating a time-varying linear pressure (a rolling load) of the rolling roller according to an embodiment of the present invention.

As a fourth experimental example, the test results of the variation in load applied from the rolling roller 130 to the unfinished electrode 10a may be summarized as shown in the graph of FIG. 6. That is, it is seen that the value of the rolling load applied from the rolling roller 130 to the unfinished electrode 10a gradually increases from 1.9 kg/m² to 2.4 kg/m² as a time elapses. Thus, as the time elapses, the surface roughness of the rolling roller 130 increases. As a result, it is seen that the increase in surface roughness of the rolling roller 130 causes an increase in rolling load value of the rolling roller 130.

The above-described system for manufacturing the electrode for the secondary battery according to an embodiment of the present invention may inspect the surface roughness and the rolling load of the rolling roller 130 and the surface roughness of the finished electrode 10 at the same time. Due to the above-described feature, the quality inspection of the electrode may be more precisely performed. Particularly, the replacement period of the rolling roller for rolling the electrode may be more accurately determined.

Hereinafter, a manufacturing method using the system for manufacturing the electrode for the secondary battery according to an embodiment of the present invention will be described.

[Method for Manufacturing Electrode for Secondary Battery According to Embodiment]

Figure 7:
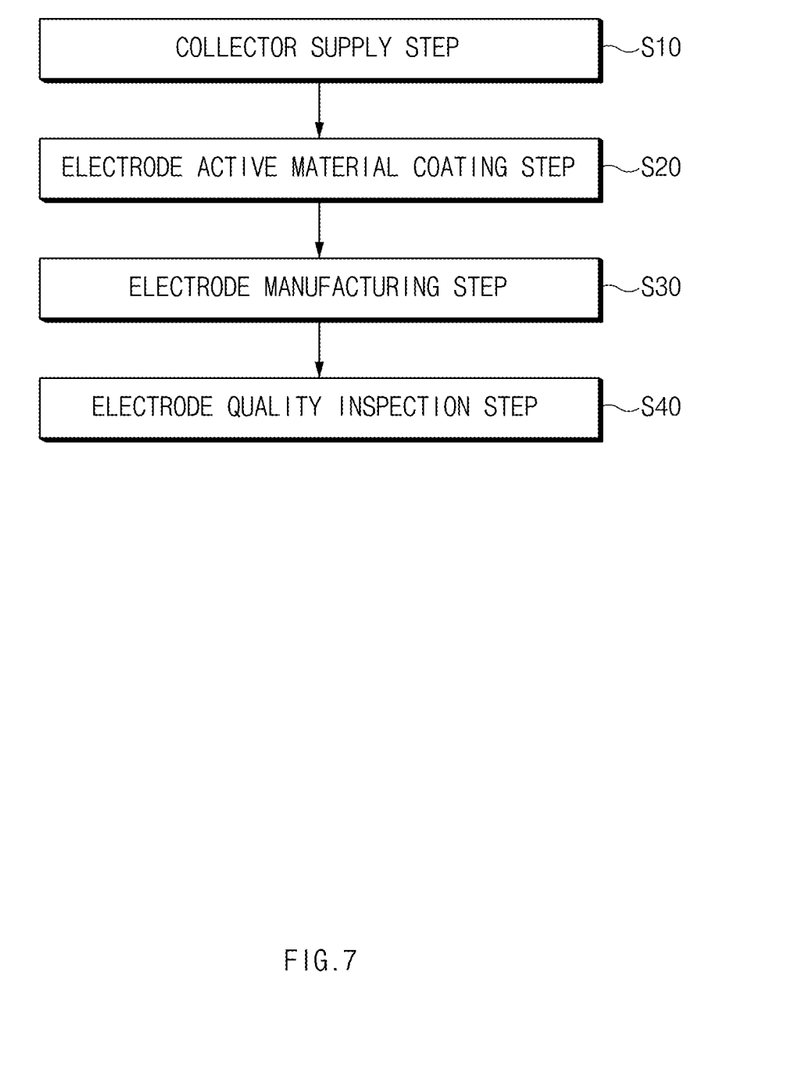
FIG. 7 is a flowchart illustrating a method for manufacturing an electrode for a secondary battery according to an embodiment of the present invention.

As illustrated in FIG. 7, the method for manufacturing an electrode for a secondary battery according to an embodiment of the present invention comprises a supply step (S10) of supplying a collector 11 having a long sheet shape, an electrode active material coating step (S20) of applying an electrode active material 12 to a surface of the collector 11 to manufacture an unfinished electrode 10a, an electrode manufacturing step (S30) of rolling a surface of the unfinished electrode 10a by using a rolling roller 130 and adjusting a thickness of the electrode active material 12 to manufacture a finished electrode 10, and an electrode quality inspection step (S40) of inspecting quality of the finished electrode 10 through a surface roughness value Rz of the rolling roller 130, a rolling load value of the rolling roller 130, and a surface roughness value Rz of the electrode active material 12 applied to the finished electrode 10.

In the supply step (S10), the collector 11 having the long sheet shape, which is wound around a supply roller 110, is continuously supplied to an electrode active material coating device 120.

In the electrode active material coating step (S20), the electrode active material 12 may be applied to the surface of the collector 11 supplied by the supply roller 110 through the electrode active material coating device 120 to manufacture the unfinished electrode 10a.

In the electrode manufacturing step (S30), the unfinished electrode 10a may be rolled by using the rolling roller 130 to uniformly adjust the thickness of the electrode active material 12, thereby manufacturing the finished electrode 10.

The electrode quality inspection step (S40) is performed to inspect quality of the finished electrode 10. The electrode quality inspection step (S40) comprises a first process (S41) of measuring a surface roughness value Rz of the rolling roller 130, a second process (S42) of measuring a surface roughness value Rz of the electrode active material applied to the finished electrode 10, a third process (S43) of measuring a rolling load applied from the rolling roller 130 to the electrode, a fourth process (S44) of performing a first inspection to determine whether the measured surface roughness value Rz of the rolling roller 130 is within a range of the inputted surface roughness value Rz of the rolling roller, a fifth process (S45) of performing a second inspection to determine whether the measured surface roughness value Rz of the finished electrode 10 is within a range of the inputted surface roughness value Rz of the electrode, and a sixth process (S46) of performing a third inspection to determine whether the rolling load value of the rolling roller 130 is within a range of the inputted rolling load value of the rolling roller.

In the first process (S41), the surface roughness of the rolling roller 130 is measured through a rolling roller measuring unit 141. That is, in the rolling roller measuring unit 141 a tip having a needle shape, which is attached to one surface, measures roughness while moving from a surface of one end to a surface of the other end of the rolling roller 130 and then calculates a mean value of a maximum mountain height and a minimum mountain height within the moving distance and thereby to calculate the surface roughness value Rz of the rolling roller 130.

In the second process (S42), the surface roughness of the electrode active material 12 applied to the finished electrode 10 is measured through an electrode measuring unit 142. That is, the electrode measuring unit 142 enlarges and photographs a surface of the finished electrode 10 and calculates a maximum mountain height and a minimum mountain height within a moving distance while moving from one end to the other end of the photographed image to calculate the surface roughness value Rz of the electrode.

In the third process (S43), the rolling load applied from the rolling roller 130 to the unfinished electrode 10a is measured through a pressure measuring unit 143. That is, the input measuring unit 143 detects a variation in load applied while the unfinished electrode 10a is rolled by the rolling roller 130 to calculate the rolling load value of the rolling roller 130.

In the fourth process (S44), the inspection unit 144 performs the first inspection to determine whether the surface roughness value Rz of the rolling roller 130, which is measured by the rolling roller measuring unit 141, is within a range of the inputted surface roughness value Rz of the rolling roller.

For example, the inspection unit 144 determines the measured surface roughness value Rz of the rolling roller 130 as being normal when the range of the inputted surface roughness value Rz of the rolling roller is 0.5 µm or less, preferably, 0.4 µm or less, and the surface roughness value Rz of the rolling roller, which is measured by the rolling roller measuring unit 141, is 0.4 µm. If the surface roughness value Rz of the rolling roller 130, which is measured by the rolling roller measuring unit 141, is 0.7 µm, the measured surface roughness value Rz of the rolling roller 130 is determined as being abnormal.

In the fifth process (S45), the inspection unit 144 performs the second inspection to determine whether the surface roughness value Rz of the finished electrode 10, which is measured by the electrode measuring unit 142, is within a range of the inputted surface roughness value Rz of the electrode.

For example, the inspection unit 144 determines the measured surface roughness value Rz of the finished electrode 10 as being normal when the range of the inputted surface roughness value Rz of the electrode is 3 µm or less, preferably, 2 µm or less, and the measured surface roughness value Rz of the finished electrode is 2 µm. If the measured surface roughness value Rz of the finished electrode 10 is 4 µm, the measured surface roughness value Rz of the finished electrode 10 is determined as being abnormal.

In the sixth process (S46), the inspection unit 144 performs the third inspection to determine whether the rolling load value of the rolling roller 130, which is measured by the rolling roller measuring unit 143, is within a range of the inputted rolling load value of the rolling roller.

For example, the inspection unit 144 determines the measured rolling load value of the rolling roller as being normal when the range of the inputted rolling load value is 1.5 kg/m$^2$ to 2.0 kg/m$^2$, and the measured rolling load value of the rolling roller 130 is 1.9 kg/m$^2$.

Here, in the electrode quality inspection step (S40), the finished electrode 10 is determined as the normal product when all of the results are determined as being normal through the first, second, and third inspections. Also, the finished electrode 10 is determined as the product to be re-inspected when one or two results are determined as being normal, and the rest result is determined as being abnormal through the first, second, and third inspections. Also, the finished electrode 10 is determined as the abnormal product when all of the results are determined as being abnormal through the first, second and third inspections.

Thus, in the method for manufacturing the electrode for the secondary battery according to an embodiment of the present invention, the quality of the finished electrode may be more precisely inspected.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A system for manufacturing an electrode for a secondary battery, the system comprising:
   a supply roller for supplying a collector having a long sheet shape;
   an electrode active material coating device for applying an electrode active material to a surface of the collector being supplied by the supply roller to manufacture an unfinished electrode;
   a rolling roller for rolling a surface of the unfinished electrode and adjusting a thickness of the electrode active material to manufacture a finished electrode; and
   an electrode quality inspection device, the electrode quality inspection device comprising:
      a rolling roller measuring unit for measuring surface roughness of the rolling roller,
      wherein the rolling roller measuring unit is coupled to the rolling roller;
      an electrode measuring unit for measuring a surface roughness of the electrode active material applied to the finished electrode, wherein the electrode measuring unit is downstream of the rolling roller and measures the surface roughness of the electrode active material after passing through the rolling roller;
      a pressure measuring unit for measuring a rolling load applied from the rolling roller to the unfinished electrode, and
      an inspection unit configured to stop operation of the rolling roller when one or more of the surface roughness of the rolling roller, the surface roughness of the electrode, and the rolling load are outside respective ranges of inputted values.

2. The system of claim 1, wherein the electrode quality inspection device determines the finished electrode as a normal product, a product to be re-inspected, or an abnormal product,
   wherein the finished electrode is the normal product when all of the surface roughness of the rolling roller, the surface roughness of the electrode, and the rolling load are within the respective ranges of inputted values,
   wherein the finished electrode is the product to be re-inspected when one or two of the surface roughness of the rolling roller, the surface roughness of the electrode, and the rolling load are within the respective ranges of inputted values, and
   wherein the finished electrode is the abnormal product when all of the surface roughness of the rolling roller, the surface roughness of the electrode, and the rolling load respective values of the first to third inspections are outside the respective ranges of inputted values.

3. The system of claim 2, wherein the electrode quality inspection device has an inspection period at intervals of 2 weeks to 4 weeks.

4. The system of claim 2, wherein the electrode quality inspection device inspects one or more of the surface roughness of the rolling roller, the surface roughness of the electrode, and the rolling load to determine if the inputted values are outside respective ranges, and re-inspects when one or two of the surface roughness of the rolling roller, the surface roughness of the electrode, and the rolling load are outside the respective ranges of inputted values, and the remaining inputted values are within the respective ranges.

5. The system of claim 4, wherein the electrode quality inspection device stops an operation of the rolling roller when one or more of the inputted values are outside the respective ranges after the re-inspection.

6. The system of claim 3, wherein the electrode quality inspection device changes the inspection period of 2 weeks to 4 weeks to an inspection period of 2 days to 7 days when one or more of the inputted values are outside the respective ranges after initial inspection by the inspection unit, and are within the respective ranges after re-inspection.

7. The system of claim 2, wherein the electrode quality inspection device stops an operation of the rolling roller when all of the surface roughness of the rolling roller, the surface roughness of the electrode, and the rolling load are outside the respective ranges of inputted values.

8. The system of claim 1, wherein the rolling roller measuring unit comprises a roughness tester measuring the surface roughness while contacting the surface of the rolling roller, and
   in the roughness tester, a tip having a needle shape, which is attached to one surface, measures roughness while moving from a surface of one end to a surface of the other end of the rolling roller and calculates a mean value of a maximum mountain height and a minimum mountain height within a moving distance to calculate the surface roughness value of the rolling roller.

9. The system of claim 8, wherein the roughness tester measures the surface roughness at at least four spots in a circumferential direction of the rolling roller.

10. The system of claim 1, wherein the inputted value of the surface roughness of the rolling roller ranges of 0.5 μm or less.

11. The system of claim 1, wherein the electrode measuring unit comprises an optical measuring part measuring surface roughness while enlarging and photographing the surface of the finished electrode, and
   the optical measuring part enlarges and photographs the surface of the finished electrode while moving from one end to the other end in a width direction of the finished electrode and calculates a maximum mountain height and a minimum mountain height within the moving distance to calculate the surface roughness value of the finished electrode.

12. The system of claim 1, wherein the inputted value of the surface roughness of the rolling roller is 3 μm or less.

13. The system of claim 1, wherein the pressure measuring unit comprises a pressure sensor, and
   the pressure sensor measures the rolling load applied to the unfinished electrode through the rolling roller to calculate the rolling load value.

14. The system of claim 1, wherein the inputted value of the rolling load of the rolling roller is 1.5 kg/m$^2$ to 2.0 kg/m$^2$.

* * * * *